US010575053B2

(12) United States Patent
Qin et al.

(10) Patent No.: US 10,575,053 B2
(45) Date of Patent: Feb. 25, 2020

(54) SYSTEM, METHOD AND CONTROL SERVER FOR MEDIA DISPLAY ON VIDEO WALL

(71) Applicant: VIA Technologies, Inc., New Taipei (TW)

(72) Inventors: Nan Qin, Shanghai (CN); Peng Jin, Shanghai (CN)

(73) Assignee: VIA Technologies, Inc., New Taipei (TW)

( * ) Notice: Subject to any disclaimer, the term of this patent is extended or adjusted under 35 U.S.C. 154(b) by 0 days.

(21) Appl. No.: 16/162,403

(22) Filed: Oct. 17, 2018

(65) Prior Publication Data

US 2019/0335237 A1 Oct. 31, 2019

(30) Foreign Application Priority Data

Apr. 25, 2018 (CN) .......................... 2018 1 0381897

(51) Int. Cl.
*H04N 19/40* (2014.01)
*H04N 21/4402* (2011.01)
(Continued)

(52) U.S. Cl.
CPC ..... *H04N 21/440272* (2013.01); *G01B 11/03* (2013.01); *G01B 11/25* (2013.01); *G06F 3/1446* (2013.01); *H04N 19/40* (2014.11)

(58) Field of Classification Search
CPC .................................................... H04N 19/40
See application file for complete search history.

(56) References Cited

U.S. PATENT DOCUMENTS

| 6,501,441 | B1 * | 12/2002 | Ludtke | G06F 3/1446 345/1.1 |
| 6,763,377 | B1 * | 7/2004 | Belknap | H04L 29/06027 709/223 |

(Continued)

FOREIGN PATENT DOCUMENTS

| CN | 104254014 | 12/2014 |
| TW | 201413577 | 4/2014 |
| TW | I620162 | 4/2018 |

OTHER PUBLICATIONS

"Office Action of Taiwan Counterpart Application", dated Mar. 28, 2019, pp. 1-10.

*Primary Examiner* — Paulos M Natnael
(74) *Attorney, Agent, or Firm* — JCIPRNET

(57) ABSTRACT

A system, a method, and a control server for media display on a video wall are provided. The system includes a media server, a plurality of transcode servers, a video wall, and a control server connected through a network. The media server provides a media file. The control server determines cutting parameters used to cut a medium recorded in the media file into video data suitable for display on each of a plurality of displays according to configuration information of the displays in the video wall to generate a plurality of transcode tasks including the cutting parameters, and sequentially assigns the transcode tasks to the transcode servers to perform transcoding. The media server collects transcode result files uploaded by each of the transcode servers and provides the same for a player of the corresponding display to read and display on the display.

15 Claims, 5 Drawing Sheets

(51) Int. Cl.
*G01B 11/03* (2006.01)
*G01B 11/25* (2006.01)
*G06F 3/14* (2006.01)

(56) References Cited

U.S. PATENT DOCUMENTS

| | | | | |
|---|---|---|---|---|
| 6,963,910 | B1 * | 11/2005 | Belknap | H04H 20/82 |
| | | | | 709/223 |
| 7,117,259 | B1 * | 10/2006 | Rohwer | H04L 65/4069 |
| | | | | 709/223 |
| 8,911,291 | B2 * | 12/2014 | Liu | G07F 17/3225 |
| | | | | 348/14.1 |
| 10,079,963 | B1 * | 9/2018 | Liu | H04N 5/04 |
| 2003/0009762 | A1 * | 1/2003 | Hooper | G06Q 30/02 |
| | | | | 725/91 |
| 2015/0215497 | A1 * | 7/2015 | Zhang | H04N 21/4307 |
| | | | | 348/521 |
| 2015/0341570 | A1 * | 11/2015 | Jaynes | G06F 3/04817 |
| | | | | 348/705 |
| 2016/0337706 | A1 * | 11/2016 | Hwang | H04N 21/23614 |
| 2016/0357493 | A1 * | 12/2016 | Zerwas | G06F 3/1438 |
| 2017/0222987 | A1 * | 8/2017 | Krieger | H04L 67/42 |

* cited by examiner

SYSTEM, METHOD AND CONTROL SERVER FOR MEDIA DISPLAY ON VIDEO WALL

CROSS-REFERENCE TO RELATED APPLICATION

This application claims the priority benefit of China application serial no. 201810381897.5, filed on Apr. 25, 2018. The entirety of the above-mentioned patent application is hereby incorporated by reference herein and made a part of this specification.

BACKGROUND OF THE INVENTION

Field of the Invention

The disclosure relates to a system, a device, and a method for media display, and in particular, to a system, a device, and a method for media display on a video wall.

Description of Related Art

As technologies related to computers, the Internet, multimedia, and mobile terminals constantly improve, there is a growing demand for support for high-definition and ultra-high-definition videos in the technical field of media display. The current large-sized video wall media casting systems are generally formed by joining together a plurality of players connected to displays. In the conventional display method, each of the players loads and decodes the whole video and only displays a portion of the video in playback.

However, in the case of displaying high-definition or ultra-high-definition videos, the conventional display method requires that all of the players have sufficient decoding capacity. In consideration of the costs, this is obviously not the best solution.

SUMMARY OF THE INVENTION

In view of the above, the invention provides a system, a method, and a control server for media display on a video wall that can support display of ultra-high-definition videos regardless of the limit of the decoding capacity of single players and can flexibly control video transcoding efficiency through dynamic capacity expansion/contraction of transcode servers.

The system for media display on a video wall of the invention includes a media server, a plurality of transcode servers, a video wall, and a control server. The media server is configured to provide a media file. The transcode servers are connected to the media server through a network and are configured to transcode the media file provided by the media server. The video wall includes a plurality of displays and a plurality of players respectively coupled to the displays, wherein each of the players is connected to the media server through the network. The control server is connected to the transcode servers and the players through the network, determines cutting parameters used to cut a medium recorded in the media file into video data suitable for display on each of the displays according to configuration information of the displays to generate a plurality of transcode tasks including the cutting parameters, and sequentially assigns the transcode tasks to the transcode servers to perform transcoding. The media server collects transcode result files uploaded by each of the transcode servers and provides the transcode result files for the corresponding players to read and display on the connected displays.

The control server of the invention includes a communication module and a processor. The communication module is connected to a plurality of transcode servers and a plurality of players of a video wall through a network. The processor is coupled to the communication module, determines cutting parameters used to cut a medium recorded in a media file into video data suitable for display on displays according to configuration information of the displays in the video wall to generate a plurality of transcode tasks including the cutting parameters, and sequentially assigns the transcode tasks to the transcode servers to perform transcoding. The media file is provided by a media server, and the media server collects transcode result files uploaded by each of the transcode servers and provides the transcode result files for the corresponding players to read and display on the connected displays.

The method for media display on a video wall of the invention is adapted for a system for media display on the video wall including a media server, a plurality of transcode servers, the video wall, and a control server connected through a network. The method includes the following steps. The control server determines cutting parameters used to cut a medium into video data suitable for display on a plurality of displays in the video wall according to configuration information of the displays, and generates a plurality of transcode tasks including the cutting parameters. The control server sequentially assigns the transcode tasks to the transcode servers. Each of the transcode servers cuts and decodes a media file obtained from the media server according to the cutting parameters in the received transcode tasks, and uploads transcode result files to the media server. Players of each of the displays read the corresponding transcode result files from the media server and display the transcode result files on the displays.

In light of the above, the system, the method, and the control server for media display on a video wall of the invention cut the medium to be displayed into the size suitable for display on each of the displays in the video wall and assign the medium to the distributed transcode server group to perform transcoding. The transcoded result files are collected by the media server and are then delivered to the player of each of the displays in the video wall for display. Accordingly, display of ultra-high-definition videos can be supported, and video transcoding efficiency can be improved.

To provide a further understanding of the aforementioned and other features and advantages of the disclosure, exemplary embodiments, together with the reference drawings, are described in detail below.

DESCRIPTION OF THE EMBODIMENTS

In the present embodiment, a video to be displayed is projected to a video wall coordinate system, and then intersection is taken between a bounding rectangle of each display in a video wall and a video rectangle. According to the intersection, transcode cutting parameters of the video are obtained. One set of transcode cutting parameters corresponds to one transcode task. Next, the transcode tasks are assigned to distributed transcode servers to be concurrently executed. After transcoding is completed, transcode results are collected and then delivered to the video wall for display. At this time, since a player corresponding to each of the displays only displays the cut video data, and the size of one single video data has been significantly reduced, the video data can adapt to the decoding capacity of the player, and the overall display resolution of the video wall can be guaranteed.

Figure 1:
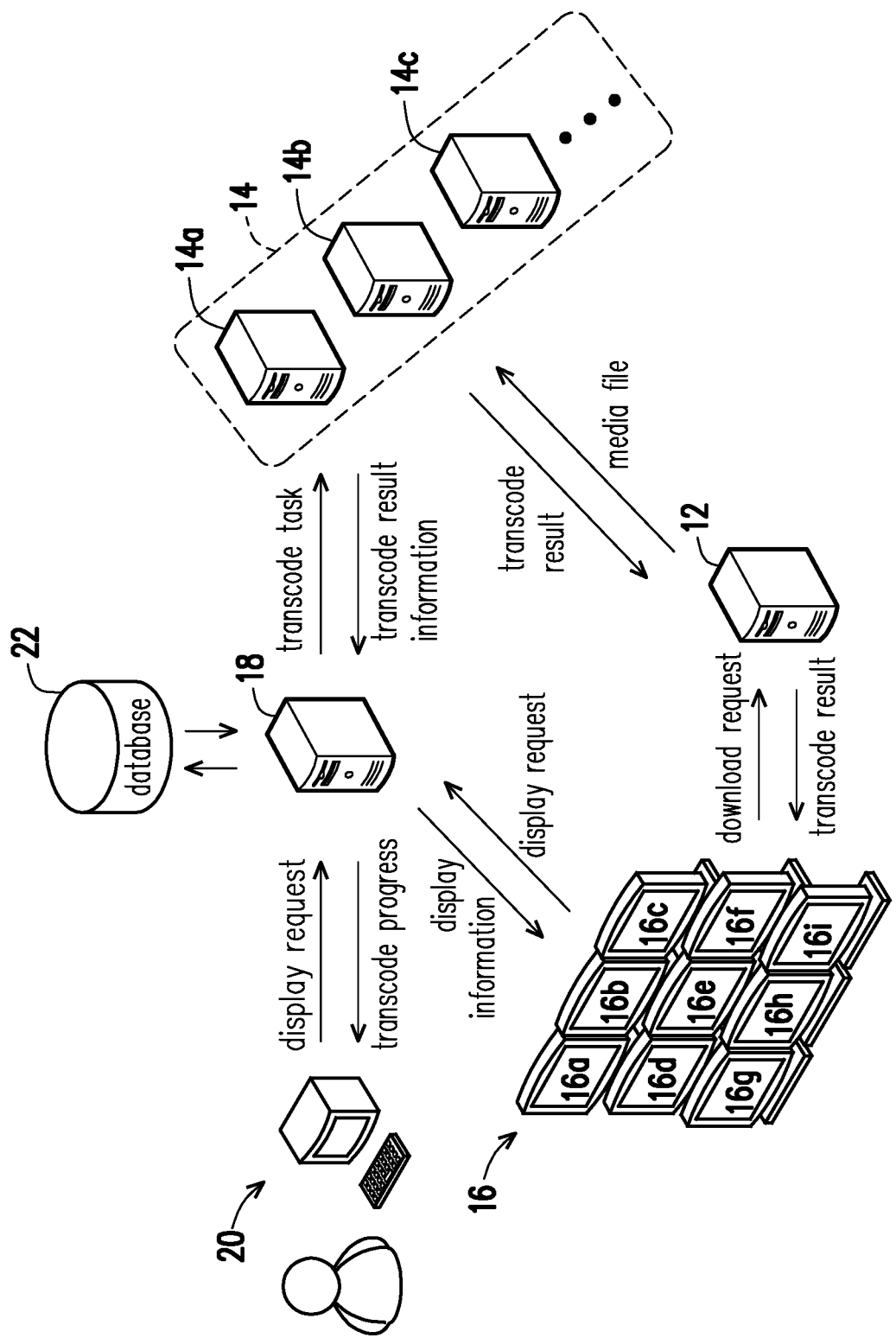
FIG. 1 is a schematic diagram illustrating a system for media display on a video wall according to an embodiment of the invention.

Referring to FIG. 1, FIG. 1 is a schematic diagram illustrating a system for media display on a video wall according to an embodiment of the invention. In the embodiment of FIG. 1, a system 1 for media display on a video wall includes a media server 12, a transcode server group 14, a video wall 16, and a control server 18. Their functions are respectively described below.

The media server 12 is, for example, an electronic device that can provide media data including videos, images, etc., such as a webcam, an encoder, a streaming server, a network video recorder, etc., or a combination of these devices, and can provide media data through a network.

The transcode server group 14 includes a plurality of transcode servers (e.g., transcode servers 14a, 14b, 14c) and is configured to perform processes such as cutting, scaling, and transcoding on a media file provided by the media server 12. The transcoding is, for example, transcoding between coding formats such as mpeg, mpg, mp4, avi, mov, mkv, H.264, etc., but the present embodiment is not limited hereto.

The video wall 16 includes a plurality of displays 16a to 16i and a plurality of players (not illustrated) respectively coupled to the displays 16a to 16i. The displays 16a to 16i are, for example, displays or TVs adopting a liquid crystal display (LCD), a light-emitting diode (LED), a field emission display (FED), or another type of panel as the display panel and adopting a cold cathode fluorescent lamp (CCFL) or a light-emitting diode (LED) as the backlight module. The displays 16a to 16i may form the video wall 16 according to the configuration shown in FIG. 1 to display different portions of the same image or display different images.

The players of the displays 16a to 16i are, for example, systems on chip (SOC) built in or externally connected to the displays 16a to 16i and may include a processor (e.g., a microcontroller, a microprocessor, a digital signal processor, etc.) and a memory (e.g., a read-only memory (ROM), a random access memory (RAM), an electrically-erasable programmable read-only memory (EEPROM), a flash memory, etc.). The players may be operated with operating systems such as Windows and Linux as well as other application programs. The players may be respectively connected to the corresponding displays 16a to 16i through a display interface such as the Video Graphics Array (VGA), the Digital Visual Interface (DVI), the High Definition Multimedia Interface (HDMI), and the DisplayPort (DP) to display images on the displays 16a to 16i. The players may also include a network card supporting Ethernet or wireless network standards such as 802.11g, 802.11n, and 802.11ac, such that the players can be connected to a network and can be connected to the media server 12 through the network.

The control server 18 is, for example, a computer device having computational capacity, such as a personal computer, a server, a workstation, etc., or a portable electronic device such as a mobile phone, a tablet computer, etc. The control server 18 may be connected to each of the transcode servers in the transcode server group 14 and the player of each of the displays in the video wall 16 through a network 20 to control the transcode servers to transcode the media file provided by the media server 12 and control the players to receive the transcoded video data from the media server 12 for display on the corresponding displays.

Figure 2:
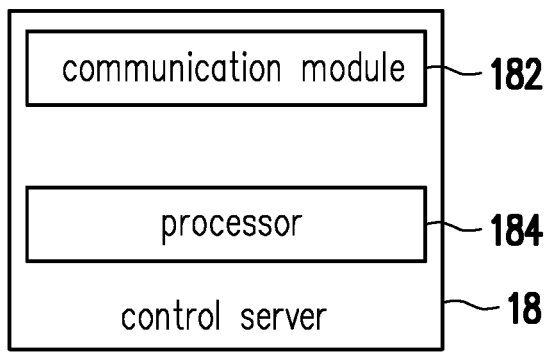
FIG. 2 is a block diagram illustrating a control server according to an embodiment of the invention.

Referring to both FIG. 1 and FIG. 2, FIG. 2 is a block diagram illustrating a control server according to an embodiment of the invention. As shown in FIG. 2, the control server 18 includes a communication module 182 and a processor 184. Specifically, the communication module 182 is, for example, a network card or a network device supporting Ethernet or wireless network standards such as 802.11g, 802.11n, 802.11ac, 802.1as, etc. and allows the control server 18 to be connected to a network in wired or wireless manners and connected to other devices (e.g., the transcode server group 14 and the player of each of the displays in the video wall 16) on the network. The processor 184 is, for example, a central processing unit (CPU) or another programmable general-purpose or specific-purpose microprocessor, digital signal processor (DSP), programmable controller, application specific integrated circuit (ASIC), programmable logic device (PLD), another similar device, or a combination of these devices. The processor 184 may load and execute computer programs to implement media display on the video wall as described in the present embodiment.

Figure 3:
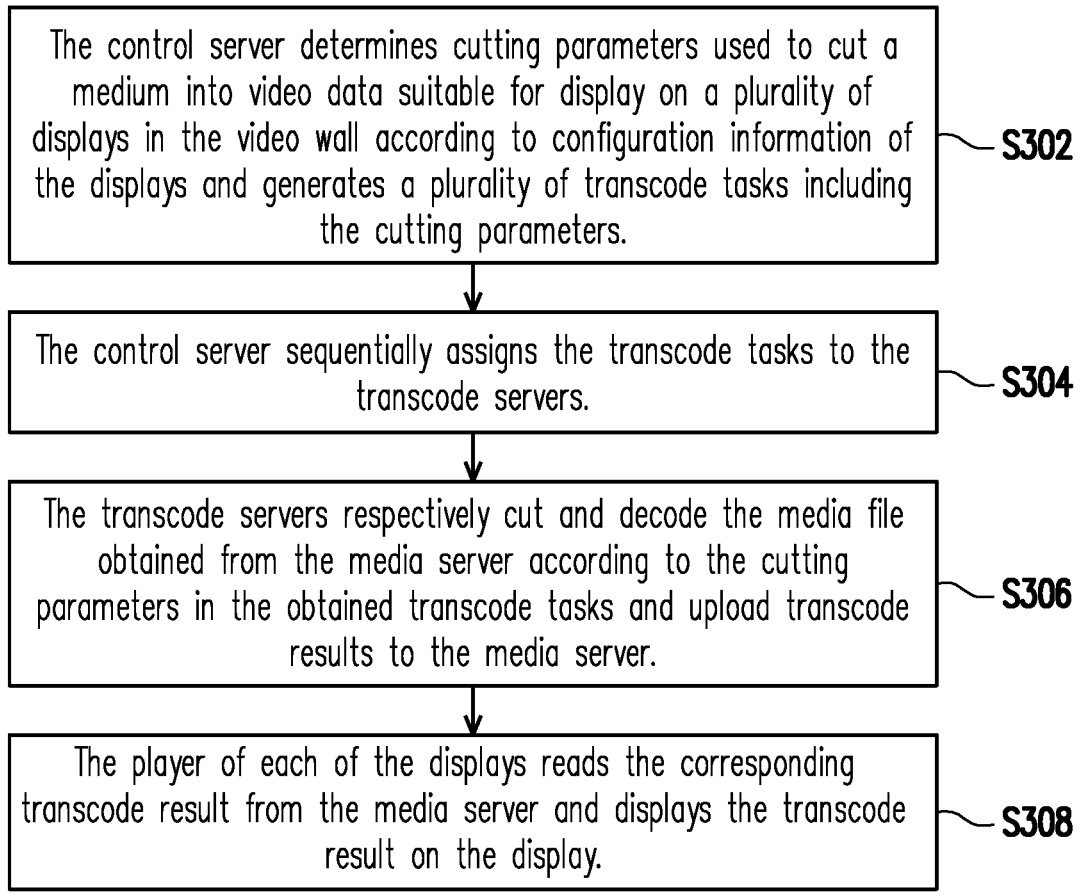
FIG. 3 is a flowchart illustrating a method for media display on a video wall according to an embodiment of the invention.

FIG. 3 is a flowchart illustrating a method for media display on a video wall according to an embodiment of the invention. Referring to FIG. 1, FIG. 2, and FIG. 3, the method of the present embodiment is adapted for the system 1 for media display on a video wall of the foregoing embodiment.

Specifically, as shown in FIG. 1, when the control server 18 receives a display request issued by a user-end computer 20, the control server 18 searches in a built-in or externally connected database 22 for relevant information (e.g., the resolution, the coding format, the storage address, etc. of a medium) of the medium requested for display by the display request. Meanwhile, the control server 18 also informs the player of each of the displays in the video wall 16 of the newly received display request and accordingly receives requests polled by the player of each of the displays in the video wall 16 to obtain configuration information (e.g., the number and the resolution of the displays and the positions of the displays in the video wall 16) of the displays in the video wall 16.

In step S302, the control server 18 determines cutting parameters used to cut the medium (stored in the media server 12) requested for display by the display request into video data suitable for display on each of the displays according to the obtained configuration information of the displays to generate a plurality of transcode tasks including the cutting parameters.

Specifically, in some embodiments, the control server 18, for example, constructs a video wall coordinate system according to the configuration information of the displays and projects the medium to a display layer of the video wall coordinate system to construct a display layer coordinate system. Specifically, an included angle is present between the display layer coordinate system and the video wall coordinate system. Next, the control server 18 cuts the medium according to boundaries of each of the displays in the video wall to obtain the transcode tasks. In some embodiments, the control server 18 takes intersection of a boundary rectangle formed by the boundaries of each of the displays and the display layer above, further projects a polygon formed by the intersection to the display layer coordinate system to calculate a bounding rectangle of the polygon in the coordinate axis directions of the display layer coordinate system, and finally cuts the medium according to the position of the bounding rectangle to generate the transcode tasks including the cutting parameters. Specifically, the non-intersecting portions do not form the transcode tasks.

Figure 4A:
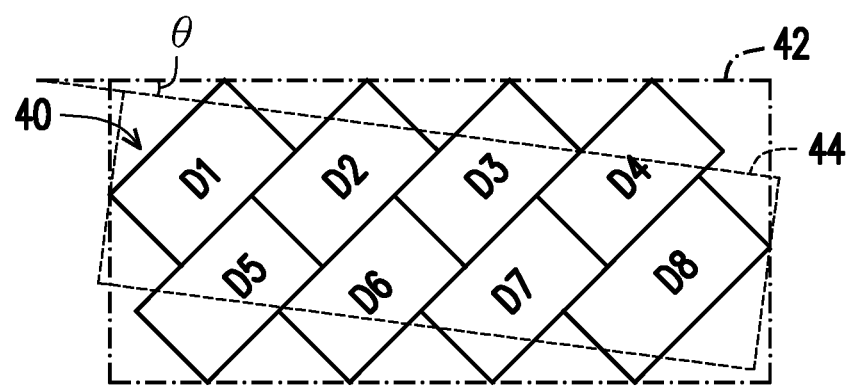
FIG. 4A to FIG. 4D are an example illustrating a method for media display on a video wall according to an embodiment of the invention.

For example, FIG. 4A to FIG. 4D are an example illustrating a method for media display on a video wall according to an embodiment of the invention. Specifically, FIG. 4A is a diagram illustrating an effect of a video wall 40 displaying an ultra-high-definition medium. The video wall 40 consists of eight displays joined together in a fishbone configuration. Numerals D1 to D8 on the displays indicate the identifiers (IDs) of the displays in the video wall 40. An ultra-high-definition media display layer 44 is rotated clockwise by θ degrees in the horizontal direction with respect to a bounding rectangle 42 of the video wall 40 in the horizontal and vertical directions.

Figure 4B:
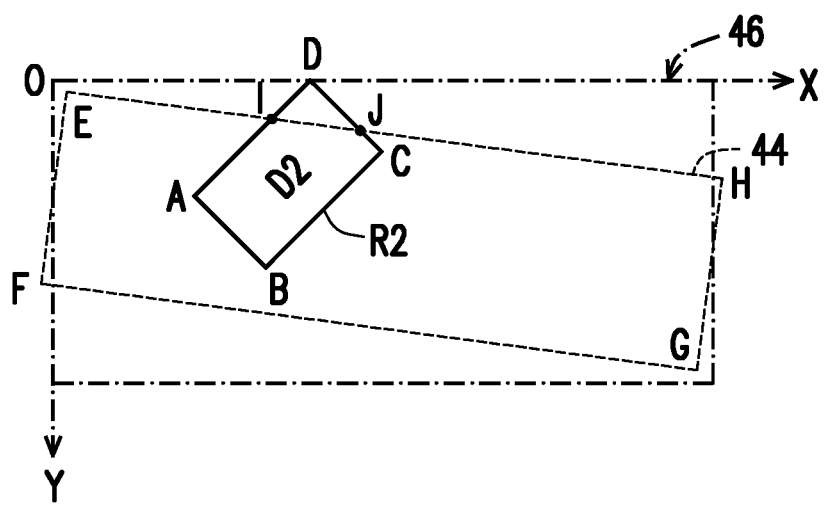

Next, FIG. 4B is a schematic diagram illustrating cutting of a display D2 as an example. To more clearly present the logics of cutting, the other seven displays are omitted here (the logics of cutting of the other displays is similar), and a video wall coordinate system 46 is constructed by setting the upper-left point of the bounding rectangle 42 in the horizontal and vertical directions of the video wall as the origin, the upper boundary as the X-axis, and the left boundary as the Y-axis.

Specifically, the coordinates of the four vertices of the display D2 in the video wall coordinate system 46 are respectively A, B, C and D, and the coordinates of the four vertices of the ultra-high-definition media display layer 44 in the video wall coordinate system 46 are respectively E, F, G and H. Accordingly, the obtained vertices of an intersecting polygon of a boundary rectangle R2 formed by the boundaries of the display D2 and the ultra-high-definition media display layer 44 in the video wall coordinate system 46 are A, B, C, J and I.

Figure 4C:
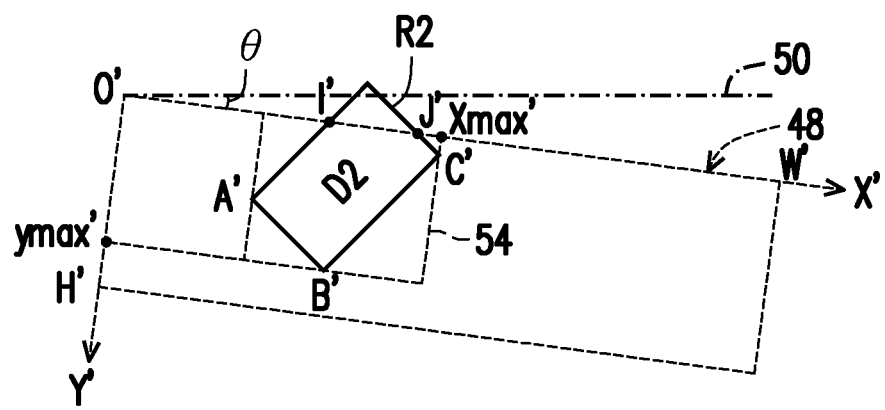

FIG. 4C is a schematic diagram illustrating coordinate conversion of the intersecting polygon. In the figure, an ultra-high-definition media display layer coordinate system 48 is constructed by setting the upper-left vertex of the ultra-high-definition media display layer 44 as the origin, the upper boundary as the X-axis, the left boundary as the Y-axis, and the included angle between the upper boundary and a horizontal line 50 as θ. After coordinate system conversion, the vertices A, B, C, J and I of the intersecting polygon in the original video wall coordinate system 46 are converted into A', B', C', J' and I' in the ultra-high-definition media display layer coordinate system 48. The conversion formula are as follows:

$$x_P'=(x_P-x_E)\cos\theta-(y_P-y_E)\sin\theta;$$

$$y_P'=(y_P-y_E)\cos\theta+(x_P-x_E)\sin\theta.$$

wherein $x_P$, $y_P$ represent the horizontal and vertical coordinates of any point of A, B, C, J and I in the video wall coordinate system 46, $x_P'$, $y_P'$ represent the horizontal and vertical coordinates corresponding to A', B', C', J' and I' after coordinate conversion, and $x_E$, $y_E$ are the horizontal and vertical coordinates of an origin O' of the ultra-high-definition media display layer coordinate system 48 in the video wall coordinate system 46.

Then, the maximum and minimum horizontal and vertical coordinates among the horizontal and vertical coordinates of A', B', C', J' and I' are calculated as follows:

$$x_{max}'=\max(x_A',x_B',x_C',x_J',x_I');$$

$$x_{min}'=\min(x_A',x_B',x_C',x_J',x_I');$$

$$y_{max}'=\max(y_A',y_B',y_C',y_J',y_I');$$

$$x_{min}'=\min(x_A',y_B',y_C',y_J',y_I');$$

A rectangle with the maximum and minimum horizontal and vertical coordinates as the boundaries is a bounding rectangle 54 of the intersecting polygon in the coordinate axis directions of the ultra-high-definition media display layer coordinate system 48.

Figure 4D:
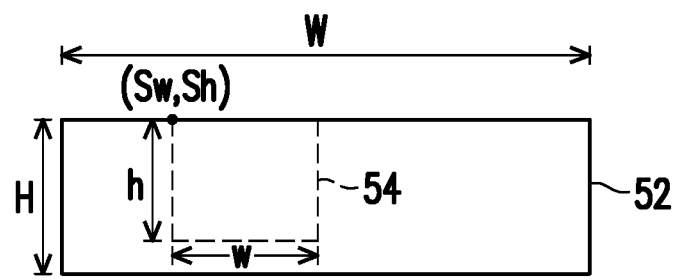

FIG. 4D is a schematic diagram illustrating the bounding rectangle 54 of the ultra-high-definition media display layer 44 corresponding to a media actual resolution 52. The specific calculation formula are as follows:

$$Sw=W\times x_{min}'/W';$$

$$Sh=H\times y_{min}'/H';$$

$$w=W\times(x_{max}'-x_{min}')/W';$$

$$h=H\times(y_{max}'-y_{min}')/H'.$$

wherein W, H respectively represent the width and height resolutions of the ultra-high-definition medium, W', H' respectively represent the width and height of the ultra-high-definition media display layer 44, and Sw, Sh, w, h respectively represent the origin position and the width and height of the bounding rectangle 54 in the media actual resolution 52. Finally, (Sw, Sh, w, h) constitute a set of transcode cutting parameter and form a transcode task.

The same operation may be analogously performed for the displays of other numerals in the video wall to obtain a transcode task queue.

It is noted that, in some embodiments, if the resolution of the media file provided by the media server 12 is so large that the media file is still larger than the resolution of each of the displays in the video wall 16 after cutting, to ensure the display quality, while the control server 18 determines the cutting parameters and generates the transcode tasks, the control server 18 further determines scaling parameters used to scale the medium, such that the scaled and cut medium can match the resolution of the corresponding display. The scaling parameters are, for example, recorded as the cutting parameters in the transcode tasks, such that the transcode server can adequately scale and cut the obtained media file to obtain a transcode result file matching the resolution of the corresponding display.

In step S304, the control server 18 sequentially assigns the transcode tasks in the transcode task queue to each of the transcode servers in the transcode server group 14. Specifically, the control server 18, for example, receives a current state reported by each of the transcode servers at predetermined times to sequentially assign the transcode tasks in the transcode task queue to the transcode servers of which the current states are idle according to the current states of the transcode servers to perform transcoding.

More specifically, in some embodiments, the transcode server controls its state by using a transcode state machine. The state includes: initialization, idle, working, fault, etc. The state transition may be collectively controlled by the control server 18 and the transcode server.

Figure 5:
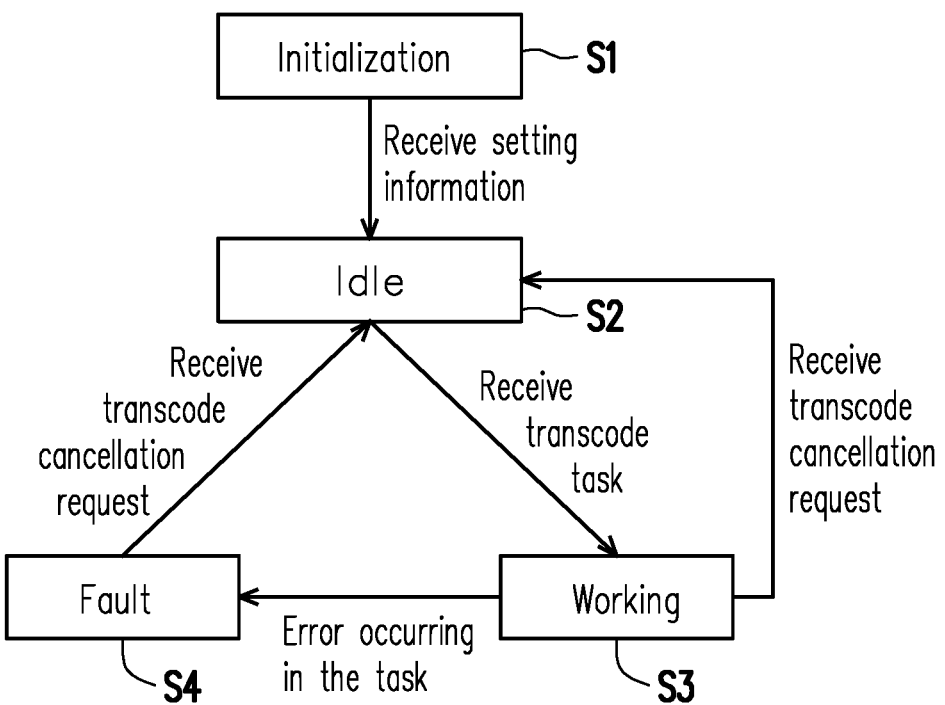
FIG. 5 is a schematic diagram illustrating a transcode state machine of a transcode server according to an embodiment of the invention.

For example, FIG. 5 is a schematic diagram illustrating a transcode state machine of the transcode server according to an embodiment of the invention. Referring to FIG. 5, after the transcode server is started, it enters an initialization state S1 to perform an initialization operation (e.g., inspecting hardware components in the transcode server, performing network connection, etc.). When the transcode server receives setting information from the control server, the initialization operation is completed, and the transcode server enters an idle state S2 to wait for the control server to assign the transcode task. When the transcode server receives the transcode task assigned by the control server, the transcode server enters a working state S3 and starts to perform a transcode operation.

In the working state S3, if the transcode server receives a transcode cancellation request sent by the control server, the transcode server stops the transcode operation and returns to the idle state S2. If an error occurs in the transcode task for various reasons (e.g., an encoding/decoding error), the transcode server enters a fault state S4 to wait for error removal and does not return to the idle state S2 until it receives the transcode cancellation request sent by the control server.

The transcode servers of the present embodiment adopt the foregoing deployment of actively connecting to the control server and actively reporting the current states and transcode result information at predetermined times. Accordingly, dynamic capacity expansion/contraction of the distributed transcode servers can be realized, and the control server can simply assign the transcode tasks according to the current states of the transcode servers and does not need to consume additional resources to manage the transcode servers.

In step S306, after receiving the transcode tasks, the transcode servers in the transcode server group 14 obtain a media file from the media server 12, cut and decode the media file according to the cutting parameters in the transcode tasks, and finally upload transcode result files to the media server 12. When the transcode servers transcode the media file, they send the transcode result information back to the control server 18 to allow the control server 18 to report a transcode progress to the user-end device 20 and send display information to the player of each of the displays in the video wall 16 to start media display.

Lastly, in step S308, the player of each of the displays sends a media file download request to the media server 12 to read the corresponding transcode result file from the media server 12 for display on the display.

Accordingly, the method for media display on a video wall of the present embodiment can support arrangement of video wall displays at any positions and any angles and support displays of different shapes and different sizes. Moreover, the displayed ultra-high-definition medium can support a layout of any position and any angle.

It is noted that, in some embodiments, the method for media display on a video wall of the present embodiment may be further operated with display identifiers (IDs), task IDs of transcode tasks, and transcode result file IDs to construct a correspondence table to be provided to the player of each of the displays in the video wall as the basis for displaying video data. In other words, the player of each of the displays may look up its display ID in the correspondence table to find and display the transcode result file of the corresponding transcode task.

Specifically, when the control server determines the cutting parameters for cutting the medium to generate the transcode tasks, the control server constructs, for example, a correspondence table of the display IDs for displaying the cut video data and the task IDs of the transcode tasks. When the transcode servers complete the transcode tasks, the transcode servers send back the transcode result information. At this time, the control server may combine the information with the previously constructed correspondence table of the display IDs and the task IDs to construct a correspondence table of the display IDs and the transcode result file IDs and provide the correspondence table to the player of each of the displays in the video wall. The player may look up its display ID in the correspondence table of the display IDs and the transcode result file IDs to find and display the corresponding transcode result file.

In summary of the above, the system, the method, and the control server for media display on a video wall of the invention cut the media file to be displayed into the video data suitable for display on each of the displays according to the configuration information of displays in the video wall to perform transcoding. When the player of each of the displays displays the media file, the player only displays the cut video data. Since the size of one single video data has been significantly reduced and can adapt to the decoding capacity of the player, the overall display resolution of the video wall can be guaranteed. Moreover, the invention can effectively solve the issue of insufficient decoding capacity of the video wall players and, to a certain degree, solve the issue of video transcoding efficiency at the same time. In addition, the distributed transcode servers can support dynamic capacity expansion/contraction.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A system for media display on a video wall, comprising:
   a media server providing a media file;
   a plurality of transcode servers, connected to the media server through a network, transcoding the media file provided by the media server;
   a video wall comprising a plurality of displays and a plurality of players respectively coupled to the displays, wherein each of the players is connected to the media server through the network; and
   a control server, connected to the transcode servers and the players through the network, determining cutting parameters used to cut a medium recorded in the media file into video data suitable for display on each of the displays according to configuration information of the displays to generate a plurality of transcode tasks comprising the cutting parameters, and sequentially assigning the transcode tasks to the transcode servers to perform transcoding, wherein
   the media server collects transcode result files uploaded by each of the transcode servers and provides the transcode result files for the corresponding players to read and display on the connected displays, wherein the control server further constructs a correspondence table between identifiers of the transcode tasks, identifiers of the transcode result files, and identifiers of the corresponding displays to allow each of the players to search for and display the corresponding transcode result file accordingly.

2. The system for media display on a video wall according to claim 1, wherein the control server is configured to:
construct a video wall coordinate system according to the configuration information of the displays;
project the medium to a display layer of the video wall coordinate system to construct a display layer coordinate system, wherein an included angle is present between the display layer coordinate system and the video wall coordinate system; and
determine the cutting parameters for cutting the medium according to boundaries of each of the displays in the video wall to obtain the transcode tasks.

3. The system for media display on a video wall according to claim 2, wherein the control server is configured to:
take intersection of a boundary rectangle formed by the boundaries of each of the displays and the display layer;
project a polygon formed by the intersection to the display layer coordinate system to calculate a bounding rectangle of the polygon in coordinate axis directions of the display layer coordinate system; and
determine the cutting parameters for cutting the medium according to a position of the bounding rectangle to generate the transcode tasks comprising the cutting parameters.

4. The system for media display on a video wall according to claim 1, wherein the control server further determines scaling parameters for scaling the medium and records the scaling parameters in the transcode tasks, such that the scaled and cut medium matches a resolution of the corresponding display.

5. The system for media display on a video wall according to claim 1, wherein the control server receives current states reported by each of the transcode servers at predetermined times to sequentially assign the transcode tasks to the transcode servers of which the current states are idle according to the current states of the transcode servers to perform transcoding.

6. A control server comprising:
a communication module connected to a plurality of transcode servers and a plurality of players of a video wall through a network; and
a processor, coupled to the communication module, determining cutting parameters used to cut a medium recorded in a media file into video data suitable for display on displays according to configuration information of the displays in the video wall to generate a plurality of transcode tasks comprising the cutting parameters, and sequentially assigning the transcode tasks to the transcode servers to perform transcoding, wherein
the media file is provided by a media server, and the media server collects transcode result files uploaded by each of the transcode servers and provides the transcode result files for the corresponding players to read and display on the connected displays,
wherein the processor further constructs a correspondence table between identifiers of the transcode tasks, identifiers of the transcode result files, and identifiers of the corresponding displays to allow each of the players to search for and display the corresponding transcode result file accordingly.

7. The control server according to claim 6, wherein the processor is configured to:
construct a video wall coordinate system according to the configuration information of the displays;
project the medium to a display layer of the video wall coordinate system to construct a display layer coordinate system, wherein an included angle is present between the display layer coordinate system and the video wall coordinate system; and
determine the cutting parameters for cutting the medium according to boundaries of each of the displays in the video wall to obtain the transcode tasks.

8. The control server according to claim 7, wherein the processor is configured to:
take intersection of a boundary rectangle formed by the boundaries of each of the displays and the display layer;
project a polygon formed by the intersection to the display layer coordinate system to calculate a bounding rectangle of the polygon in coordinate axis directions of the display layer coordinate system; and
determine the cutting parameters for cutting the medium according to a position of the bounding rectangle to generate the transcode tasks comprising the cutting parameters.

9. The control server according to claim 6, wherein the processor further determines scaling parameters for scaling the medium and records the scaling parameters in the transcode tasks, such that the scaled and cut medium matches a resolution of the corresponding display.

10. The control server according to claim 6, wherein the processor receives current states reported by each of the transcode servers at predetermined times to sequentially assign the transcode tasks to the transcode servers of which the current states are idle according to the current states of the transcode servers to perform transcoding.

11. A method for media display on a video wall adapted for a system for media display on the video wall comprising a media server, a plurality of transcode servers, the video wall, and a control server connected through a network, the method comprising:
determining, by the control server, cutting parameters used to cut a medium into video data suitable for display on a plurality of displays in the video wall according to configuration information of the displays, and generating a plurality of transcode tasks comprising the cutting parameters;
sequentially assigning, by the control server, the transcode tasks to the transcode servers;
cutting and decoding, by each of the transcode servers, a media file obtained from the media server according to the cutting parameters in the received transcode tasks, and uploading transcode result files to the media server;
reading, by a player of each of the displays, the corresponding transcode result file from the media server and displaying the transcode result file on the displays; and
constructing, by the control server, a correspondence table between identifiers of the transcode tasks, identifiers of the transcode result files, and identifiers of the corresponding displays to allow each of the players to search for and display the corresponding transcode result file accordingly.

12. The method according to claim 11, wherein the step of determining, by the control server, the cutting parameters used to cut the medium into the video data suitable for display on the plurality of displays in the video wall according to the configuration information of the displays, and generating the plurality of transcode tasks comprising the cutting parameters comprises:

constructing a video wall coordinate system according to the configuration information of the displays;

projecting the medium to a display layer of the video wall coordinate system to construct a display layer coordinate system, wherein an included angle is present between the display layer coordinate system and the video wall coordinate system; and cutting the medium according to boundaries of each of the displays in the video wall to obtain the transcode tasks.

13. The method according to claim 12, wherein the step of cutting the medium according to the boundaries of each of the displays in the video wall to obtain the transcode tasks comprises:

taking intersection of a boundary rectangle formed by the boundaries of each of the displays and the display layer;

projecting a polygon formed by the intersection to the display layer coordinate system to calculate a bounding rectangle of the polygon in coordinate axis directions of the display layer coordinate system; and cutting the medium according to a position of the bounding rectangle to generate the transcode tasks comprising the cutting parameters.

14. The method according to claim 11, wherein the step of determining, by the control server, the cutting parameters used to cut the medium into the video data suitable for display on the plurality of displays in the video wall according to the configuration information of the displays, and generating the plurality of transcode tasks comprising the cutting parameters further comprises:

determining scaling parameters for scaling the medium and recording the scaling parameters in the transcode tasks, such that the scaled and cut medium matches a resolution of the corresponding display.

15. The method according to claim 11, wherein the step of sequentially assigning, by the control server, the transcode tasks to the transcode servers comprises:

receiving current states reported by each of the transcode servers at predetermined times to sequentially assign the transcode tasks to the transcode servers of which the current states are idle according to the current states of the transcode servers to perform transcoding.

* * * * *